United States Patent
Horiguchi et al.

(10) Patent No.: US 11,104,794 B2
(45) Date of Patent: Aug. 31, 2021

(54) POLYBUTYLENE TEREPHTHALATE RESIN COMPOSITION FOR MOLDED BODY FOR WELDING POLYESTER ELASTOMER, AND COMPOSITE MOLDED BODY

(71) Applicant: TOYOBO CO., LTD., Osaka (JP)

(72) Inventors: Satoru Horiguchi, Shiga (JP); Motonobu Kamiya, Shiga (JP); Yasuto Fujii, Shiga (JP)

(73) Assignee: TOYOBO CO., LTD., Osaka (JP)

( * ) Notice: Subject to any disclaimer, the term of this patent is extended or adjusted under 35 U.S.C. 154(b) by 129 days.

(21) Appl. No.: 16/488,716

(22) PCT Filed: Feb. 23, 2018

(86) PCT No.: PCT/JP2018/006697
§ 371 (c)(1),
(2) Date: Aug. 26, 2019

(87) PCT Pub. No.: WO2018/159487
PCT Pub. Date: Sep. 7, 2018

(65) Prior Publication Data
US 2021/0130605 A1  May 6, 2021

(30) Foreign Application Priority Data
Feb. 28, 2017  (JP) .............................. JP2017-037208

(51) Int. Cl.
*C08L 67/02*  (2006.01)

(52) U.S. Cl.
CPC .................................... *C08L 67/02* (2013.01)

(58) Field of Classification Search
CPC ...................................................... C08L 67/02
See application file for complete search history.

(56) References Cited

U.S. PATENT DOCUMENTS

| | | | | |
|---|---|---|---|---|
| 3,775,373 A * | 11/1973 | Wolfe, Jr. | ............ | C08G 63/672 528/301 |
| 5,236,979 A * | 8/1993 | Chiolle | .................... | C08K 5/13 524/120 |
| 5,354,532 A | 10/1994 | Nakai et al. | | |
| 6,300,399 B1 * | 10/2001 | Gallucci | .................. | C08K 3/08 524/398 |
| 2006/0047089 A1 | 3/2006 | Cho et al. | | |
| 2006/0142423 A1 | 6/2006 | Takayama et al. | | |
| 2010/0261025 A1 | 10/2010 | Miyamoto et al. | | |
| 2011/0098388 A1 | 4/2011 | Sakata et al. | | |
| 2012/0028063 A1 | 2/2012 | Sakata | | |
| 2014/0322551 A1 * | 10/2014 | Sakata | .................... | C08L 67/02 428/480 |
| 2015/0368459 A1 | 12/2015 | Yamanaka et al. | | |

FOREIGN PATENT DOCUMENTS

| | | |
|---|---|---|
| CN | 1732227 | 2/2006 |
| CN | 101691068 | 4/2010 |
| CN | 104169364 | 11/2014 |
| CN | 104861587 | 8/2015 |
| CN | 104918997 | 9/2015 |
| JP | 61-133381 | 6/1986 |
| JP | 4-119810 | 4/1992 |
| JP | 2004-315805 | 11/2004 |
| JP | 2006-176691 | 7/2006 |
| JP | 2009-149018 | 7/2009 |
| JP | 2010-1363 | 1/2010 |
| JP | 2013-189550 | 9/2013 |
| JP | 2014-133810 | 7/2014 |
| WO | 2009/150831 | 12/2009 |
| WO | 2010/122915 | 10/2010 |
| WO | 2012/014823 | 2/2012 |
| WO | 2013/047708 | 4/2013 |

OTHER PUBLICATIONS

International Search Report dated Apr. 24, 2018 in International (PCT) Application No. PCT/JP2018/006697.

* cited by examiner

*Primary Examiner* — Michael F Pepitone
(74) *Attorney, Agent, or Firm* — Wenderoth, Lind & Ponack, L.L.P.

(57) ABSTRACT

A polybutylene terephthalate resin composition for bonding a polyester elastomer for use in a molded article for welding a polyester elastomer that enables bonding by insert molding; and that ensures a practical bonding strength, even in a portion where stress is generated. The polybutylene terephthalate resin composition comprises: 40 to 95 mass % of a polybutylene terephthalate resin (A); 4 to 40 mass % of a polyester block copolymer (B); 0 to 50 mass % of a copolyester resin (C) different from (B); and 0 to 55 mass % of an inorganic filler (D), the polyester block copolymer (B) comprising, as a constituent, a hard segment composed of a polyester having a specific structure.

6 Claims, No Drawings

POLYBUTYLENE TEREPHTHALATE RESIN COMPOSITION FOR MOLDED BODY FOR WELDING POLYESTER ELASTOMER, AND COMPOSITE MOLDED BODY

TECHNICAL FIELD

The present invention relates to a polybutylene terephthalate resin composition for use in molded articles with improved welding property with respect to a polyester elastomer.

BACKGROUND ART

Polybutylene terephthalate resins are excellent in mechanical properties, electrical properties, and other physical/chemical characteristics, and are also excellent in processability. With such advantages, polybutylene terephthalate resins have been applied to various engineering plastic fields, including automobiles, electric/electronic components, and the like.

However, despite their desirable molding efficiency in forming injection-mold articles, the shape thereof is limited due to the flow characteristics and the mold structure. Therefore, it has been difficult to form, for example, a hollow molded article. Hence, bonding using an adhesive, mechanical bonding via bolts, or the like has generally been performed in the bonding of components for use in the molding of a product having a complicated shape. However, bonding using an adhesive has a problem in terms of adhesion strength; and mechanical bonding via bolts has problems in terms of cost, burden in fastening, and increased weight.

Bonding methods through welding such as hot plate welding, vibration welding, laser welding, ultrasonic welding, or the like are capable of completing bonding in a short period of time, without requiring adhesives or metal parts. Therefore, the problems of cost, weight increase, environmental pollution, and the like can be reduced. These methods are therefore recently more often used for the bonding of components (Patent Documents 1, 2, 3, and 4).

Patent Document 1 discloses that the welding property in vibration welding can be improved without a significant decrease in mechanical properties by adding an elastomer and a glass fiber to a polybutylene terephthalate resin. However, this method requires a special machine for vibration welding; moreover, the method may also require a step for the post-treatment of burrs generated during the vibration welding. Patent Document 2 discloses that the addition of an elastomer and a glass fiber to a polybutylene terephthalate resin can increase the durability and the hydrolysis resistance thereof in a cold cycle environment. However, since the composition disclosed in Patent Document 2 is a secondary material for insert molding, although the hydrolysis resistance is increased, the welding resistance and the insert bonding property are insufficient. Patent Document 3 discloses the discovery of a method of increasing hydrolysis resistance without significantly decreasing the mechanical properties, by limiting the terminal carboxyl group and adding carbodiimide. However, although this composition is excellent as a heat-welding material, as in the invention of Patent Document 1, a special machine for heat-welding is necessary for the bonding, and burrs may be generated in the heat-welded portion as in vibration welding, thus requiring a post-treatment step for burrs. Patent Document 4 discloses the correlation between the molecular weight of polybutylene terephthalate resin and the strength in vibration welding, stating that it is possible to increase the vibration welding strength without decreasing the fluidity of the resin composition constituting the molded article, by adjusting the molecular weight within a specific range. However, as in Patent Document 1, this invention also requires a special machine for vibration welding for the bonding, and burrs may be generated in the heat-welded portion as in vibration welding, thus requiring a post-treatment step for burrs.

If the bonding is possible by insert molding, a composite molded article can be easily formed, without requiring a special welding facility. Further, mechanical bonding such as vibration welding has a drawback in terms of large variation in molding conditions. Moreover, Patent Documents 1 to 4 are completely unrelated to the technical concept of bonding a polyester elastomer to a polybutylene terephthalate resin molded article by insert molding.

CITATION LIST

Patent Documents

Patent Document 1: JP2006-176691A
Patent Document 2: WO2009/150831 pamphlet
Patent Document 3: WO2010/122915 pamphlet
Patent Document 4: WO2013/047708 pamphlet

SUMMARY OF INVENTION

Technical Problem

The present invention was made to solve the above problems. An object of the invention is to provide a polybutylene terephthalate resin composition that can be bonded (welded) through insert molding, without requiring a special welding facility; and that ensures a practical bonding strength even in a portion where stress is generated. In particular, since there has been demand in the market for a composite molded article obtained by bonding (welding) a polyester elastomer to a polybutylene terephthalate resin by insert molding, and therefore having superior characteristics derived from both the polybutylene terephthalate resin and the polyester elastomer, a resin composition for use in a polybutylene terephthalate resin-based molded article required for the composite molded article has also been demanded. The present inventors conducted research, and found that practically-satisfactory bonding (welding) by insert molding is difficult not only in the bonding of a polybutylene terephthalate resin molded article with a polyester elastomer, but also in the bonding of a polybutylene terephthalate resin molded article with other resins. Further, it was also found that even if the bonding was successful, the shape of the molded article was limited, and that it therefore could not be applied to a component in which stress is applied to the bonded portion. Under this background, an object of the present invention is to provide a polybutylene terephthalate resin composition for use in a molded article for welding a polyester elastomer, that enables bonding by insert molding; and that ensures a practical bonding strength even in a portion where stress is generated. The inventors further found that the bonding (welding) may become insufficient depending on the hardness of the polyester elastomer to be welded; therefore, another new object is to provide a polybutylene terephthalate resin composition, for use in a molded article, that enables the welding of polyester elastomers with high hardness to those with low hardness.

Solution to Problem

The present inventors carried out extensive research regarding the structure and characteristics of polybutylene terephthalate resin compositions to attain the objects described above, and thereby completed the present invention.

Specifically, the present invention has the following features.

Item [1]. A polybutylene terephthalate resin composition for use in a molded article for welding a polyester elastomer, the polybutylene terephthalate resin composition comprising: 40 to 95 mass % of a polybutylene terephthalate resin (A); 4 to 40 mass % of a polyester block copolymer (B); 0 to 50 mass % of a copolyester resin (C) different from (B); and 0 to 55 mass % of an inorganic filler (D), the polyester block copolymer (B) comprising, as constituents, a hard segment (a3) and a soft segment (a4), the hard segment (a3) being composed of a polyester containing, as dicarboxylic acid components, terephthalic acid or an ester-forming derivative thereof (a1) and at least one dicarboxylic acid other than terephthalic acid or an ester-forming derivative thereof (a2) at a molar ratio ((a1)/(a2)) of 1 to 4, and the soft segment (a4) being at least one member selected from aliphatic polyethers, aliphatic polyesters, and aliphatic polycarbonates.

Item [2]. The polybutylene terephthalate resin composition according to item 1, wherein the copolyester resin (C) is a polyester resin comprising an ethylene terephthalate unit or a butylene terephthalate unit copolymerized with at least one of alkyl side chain-containing glycol and isophthalic acid.

Item [3]. A composite molded article in which a molded article comprising the polybutylene terephthalate resin composition according to item 1 or 2 and a polyester elastomer are welded.

Item [4]. A method for producing a composite molded article, comprising placing a molded article comprising the polybutylene terephthalate resin composition according to item 1 or 2 as an insert material in a mold, and welding a polyester elastomer by injection molding.

Advantageous Effects of Invention

The present invention enables even a polybutylene terephthalate resin to be bonded to a polyester elastomer through insert molding, by adding a polyester block copolymer. A composite molded article in which a molded article comprising the polybutylene terephthalate resin composition of the present invention is welded with a polyester elastomer is an insert composite molded article, which is obtainable by insert molding, i.e., a simple method, without requiring a special facility. Further, in the bonded portion of this composite molded article, the molded article comprising the polybutylene terephthalate resin composition and a polyester elastomer are directly bonded (welded) without an adhesive or a bolt between them, and the bonded portion has practical and sufficient bonding strength. Furthermore, the polybutylene terephthalate resin composition of the present invention is a polybutylene terephthalate resin composition for use in a molded article capable of welding with polyester elastomers with high hardness to those with low hardness.

DESCRIPTION OF EMBODIMENTS

The present invention is specifically described below.

Polybutylene Terephthalate Resin (A)

Polybutylene terephthalate resin (A) is a polymer obtainable by a usual polymerization method, such as a polycondensation reaction of a dicarboxylic acid containing, as a major component, terephthalic acid or an ester-forming derivative thereof with a diol containing, as a major component, 1,4-butanediol or an ester-forming derivative thereof. The polybutylene terephthalate resin preferably has 80 mol % or more, more preferably 90 mol % or more, further preferably 95 mol % or more, and particularly preferably 100 mol % of butylene terephthalate repeating units.

Polybutylene terephthalate resin (A) may comprise other components for polymerization insofar as the amounts thereof fall within a range not impairing the characteristics of the resin; for example, about 20 mass % or less. Examples of polybutylene terephthalate resins comprising other polymerization components include polybutylene (terephthalate/isophthalate), polybutylene (terephthalate/adipate), polybutylene (terephthalate/sebacate), polybutylene (terephthalate/decane dicarboxylate), polybutylene (terephthalate/naphthalate), polybutylene/ethylene) terephthalate, and the like. These components may be used solely, or as a mixture of two or more.

The intrinsic viscosity (IV) of the polybutylene terephthalate resin (A) is preferably, but not particularly limited to, 0.5 to 1.6 dl/g, more preferably 0.7 to 1.3 dl/g, and further preferably 0.8 to 1.1 dl/g. By specifying the intrinsic viscosity (IV) of the polybutylene terephthalate resin (A) to 0.5 to 1.6 dl/g, the polybutylene terephthalate resin composition produced by the present invention has desirable mechanical characteristics and chemical characteristics.

The amount of the terminal carboxyl group in the polybutylene terephthalate resin (A) is not particularly limited, since it does not affect the bonding property. However, since the terminal carboxyl group serves as something like a catalyst in the hydrolysis reaction of the polymer, the hydrolysis is accelerated along with an increase in the amount of terminal carboxyl group. Therefore, the concentration of the terminal carboxyl group is preferably low. The concentration of the terminal carboxyl group (acid value) in the polybutylene terephthalate resin (A) is preferably 40 eq/ton or less, more preferably 30 eq/ton or less, further preferably 25 eq/ton or less, and particularly preferably 20 eq/ton or less.

The concentration (unit: eq/ton) of the terminal carboxyl group in the polybutylene terephthalate resin may be measured, for example, by dissolving a predetermined amount of a polybutylene terephthalate resin in benzyl alcohol, followed by titration using a 0.01 mol/l solution of sodium hydroxide in benzyl alcohol. For example, a phenolphthalein solution may be used as the indicator.

The content of the polybutylene terephthalate resin (A) in the polybutylene terephthalate resin composition is 40 to 95 mass %, preferably 45 to 90 mass %, and more preferably 45 to 80 mass %. By specifying the content of the polybutylene terephthalate resin (A) within this range, it is possible to obtain a polybutylene terephthalate resin composition that can be bonded with a polyester elastomer, while ensuring a practical bonding strength.

Polyester Block Copolymer (B)

The polyester block copolymer (B) used in the present invention is a polyester block copolymer in which the hard segment (a3) and the soft segment (a4) are combined. The hard segment (a3) is composed of a polyester containing dicarboxylic acid and aliphatic and/or alicyclic glycol as constituents, and the soft segment (a4) is at least one member selected from aliphatic polyethers, aliphatic polyesters, and aliphatic polycarbonates. The dicarboxylic acid component constituting the polyester serving as the hard segment (a3) is composed of terephthalic acid or an ester-forming derivative thereof (a1), and at least one dicarboxylic acid other than terephthalic acid or an ester-forming derivative thereof (a2) at a molar ratio ((a1)/(a2)) of 1 to 4. The ester-forming derivative refers to, for example, a dimethyl ester of the dicarboxylic acid.

Polyester block copolymer (B) is a copolymer also generally referred to as a polyester elastomer.

Examples of dicarboxylic acids other than terephthalic acid include aromatic dicarboxylic acids such as isophthalic acid, orthophthalic acid, 2,6-naphthalenedicarboxylic acid, 1,5-naphthalenedicarboxylic acid, 1,2-bis(phenoxy)ethane-p,p'-dicarboxylic acid, and diphenyl-p,p-dicarboxylic acid; aliphatic dicarboxylic acids such as adipic acid, sebacic acid, succinic acid, glutaric acid, and dimer acid; alicyclic dicarboxylic acids such as hexahydroterephthalic acid, hexahydroisophthalic acid, and cyclohexanedicarboxylic acid; and the like. The dicarboxylic acid other than terephthalic acid is preferably a component that reduces the crystallinity of polyester block copolymer (B), in view of obtaining a polybutylene terephthalate resin composition for use in a molded article capable of welding a polyester elastomer. Therefore, the dicarboxylic acid other than terephthalic acid is preferably isophthalic acid or orthophthalic acid; and isophthalic acid is particularly preferable.

The molar ratio of the dicarboxylic acid components ((a1)/(a2)) is preferably 2 to 4. When the molar ratio is less than 1, molding processability decreases; on the other hand, when the molar ratio is more than 4, the desired bonding (welding) property cannot be obtained.

The aliphatic or alicyclic glycol that constitutes the polyester of the hard segment (a3) of the polyester block copolymer (B) used in the present invention is not particularly limited, and general aliphatic or alicyclic glycol may be widely used. However, $C_{2-8}$ alkylene glycols are mainly preferably used. Preferable examples include ethylene glycol, 1,3-propylene glycol, 1,4-butanediol, 1,6-hexanediol, and 1,4-cyclohexane dimethanol. Ethylene glycol or 1,4-butanediol is particularly preferable.

When an aromatic polyester suitable for the polyester that constitutes the hard segment (a3) of the polyester block copolymer (B) used in the present invention is produced beforehand and then copolymerized with the soft segment component, such an aromatic polyester can be easily prepared in accordance with a typical polyester production method. The polyester preferably has a number average molecular weight of 10000 to 40000.

The soft segment (a4) of the polyester block copolymer (B) used in the present invention is at least one member selected from aliphatic polyethers, aliphatic polyesters, and aliphatic polycarbonates. The aliphatic polyethers include polyoxyethylene glycol, polyoxypropylene glycol, polyoxytetramethylene glycol, polyoxyhexamethylene glycol, polyoxytrimethylene glycol, copolymers of ethylene oxide with propylene oxide, ethylene oxide adducts of polyoxyethylene glycol, and copolymers of ethylene oxide with tetrahydrofuran.

The aliphatic polyesters include poly(ε-caprolactone), polyenantholactone, polycaprylolactone, and polybutylene adipate.

Further, the aliphatic polycarbonates are preferably those formed mainly from $C_{2-12}$ aliphatic diol residues. Examples of these aliphatic diols include ethylene glycol, 1,3-propylene glycol, 1,4-butanediol, 1,5-pentanediol, 1,6-hexanediol, 1,8-octanediol, 2,2-dimethyl-1,3-propanediol, 3-methyl-1,5-pentanediol, 2,4-diethyl-1,5-pentanediol, 1,9-nonanediol, 2-methyl-1,8-octanediol, and the like. In particular, $C_{5-12}$ aliphatic diols are preferable from the standpoint of flexibility and low-temperature characteristics of the polyester block copolymer (B) to be obtained. These components may be used singly or in a combination of two or more where necessary, with reference to the descriptions below.

Aliphatic polycarbonate diols having excellent low-temperature characteristics for constituting the soft segment (a4) of the polyester block copolymer (B) usable in the present invention are preferably those having a low melting point (e.g., 70° C. or lower) and a low glass-transition temperature. An aliphatic polycarbonate diol famed from 1,6-hexanediol, which is generally used for forming the soft segment (a4) of a polyester block copolymer, has a glass-transition temperature of as low as about −60° C., and a melting point of about 50° C., thus exhibiting excellent low-temperature characteristics. In addition, an aliphatic polycarbonate diol obtained by copolymerizing the aliphatic polycarbonate diol with a suitable amount of, for example, 3-methyl-1,5-pentanediol is considered to have excellent low-temperature properties due to its decreased melting point or amorphous structure, although the glass-transition point is slightly increased compared with that of the original aliphatic polycarbonate diol. Additionally, for example, an aliphatic polycarbonate diol formed from 1,9-nonanediol and 2-methyl-1,8-octanediol is considered to have excellent low-temperature properties because of its sufficiently low melting point of about 30° C., and glass-transition temperature of about −70° C.

The polyester block copolymer (B) used in the present invention is preferably a copolymer mainly containing terephthalic acid, isophthalic acid, 1,4-butanediol, and polyoxytetramethylene glycol from the standpoint of economic performance, heat resistance, and cold resistance. In the dicarboxylic acid component constituting the polyester block copolymer (B), the total amount of terephthalic acid and isophthalic acid is preferably 40 mol % or more, more preferably 70 mol % or more, further more preferably 80 mol % or more, and particularly preferably 90 mol % or more. In the glycol component constituting the polyester block copolymer (B), the total amount of 1,4-butanediol and polyoxytetramethylene glycol is preferably 40 mol % or more, more preferably 70 mol % or more, further more preferably 80 mol % or more, and particularly preferably 90 mol % or more.

The polyoxytetramethylene glycol preferably has a number average molecular weight of 500 to 4000. When the number average molecular weight is less than 500, the elastomer characteristics may not be fully expressed. On the other hand, when the number average molecular weight is more than 4000, it is possible that the compatibility with the polyester portion constituting the hard segment (a3) of the polyester block copolymer (B) decreases, resulting in difficulty in forming a block copolymer. The polyoxytetramethylene glycol more preferably has a number average molecular weight of 800 or more, and 3000 or less; and further more preferably 1000 or more, and 2500 or less.

The copolymerization amount of the hard segment (a3) and the soft segment (a4) in the polyester block copolymer (B) used in the present invention is, as the mass ratio of the hard segment (a3) to the soft segment (a4) (a3/a4), preferably 85/15 to 35/65, more preferably 75/25 to 50/50.

The hardness (surface hardness) of the polyester block copolymer (B) used in the present invention is not particularly limited. It is possible to use a wide range of polyester block copolymers, from those having a low hardness, i.e., a Shore A hardness of about 25; to those with a high hardness, i.e., a Shore D hardness of about 75. The polyester block copolymer preferably has a Shore D hardness of 25 to 65, more preferably a Shore D hardness of 30 to 60.

The polyester block copolymer (B) used in the present invention preferably has a reduced viscosity of 0.5 dl/g or more, and 3.5 dl/g or less, as measured by the measurement method described later. A reduced viscosity of less than 0.5 dl/g may lead to low durability of the resin; while a reduced viscosity of more than 3.5 dl/g may result in insufficient processability, such as in injection molding. The polyester block copolymer (B) more preferably has a reduced viscosity of 1.0 dl/g or more, and 3.0 dl/g or less; and further more preferably 1.5 dl/g or more, and 2.8 dl/g or less. Further, the acid value of the polyester block copolymer (B) is preferably 200 eq/t or less, particularly preferably 50 eq/t or less.

The polyester block copolymer (B) used in the present invention may be produced by a known method. For example, any of the following methods may be used: a method in which a diester formed from a dicarboxylic acid and a lower alcohol, an excessive amount of a low-molecular-weight glycol, and a soft segment component are subjected to transesterification in the presence of a catalyst, and the obtained reaction product is subjected to polycondensation; a method in which a dicarboxylic acid, an excessive amount of a glycol, and a soft segment component are subjected to esterification in the presence of a catalyst, and the obtained reaction product is subjected to polycondensation; a method in which the hard segment is prepared beforehand, and a soft segment component is added to this hard segment to prepare a randomized copolymer by transesterification; a method in which the hard segment and the soft segment are linked with a chain linking agent; and, when poly(ε-caprolactone) is used for the soft segment, a method in which an addition reaction of a ε-caprolactone monomer with the hard segment is performed.

The content of the polyester block copolymer (B) in the polybutylene terephthalate resin composition is 4 to 40 mass %, preferably 5 to 35 mass %, and more preferably 15 to 30 mass %. By specifying the content of the polyester block copolymer (B) within this range, it is possible to obtain a polybutylene terephthalate resin composition that can be bonded with a polyester elastomer, while ensuring practical bonding strength. By incorporating the polyester block copolymer (B) in the amount specified above, it becomes possible to improve the bonding (welding) property; however, a polyester block copolymer (B) content of more than 40 mass % is not desirable, because the productivity decreases.

Copolyester Resin (C)

The copolyester resin (C) of the present invention is not particularly limited, insofar as it differs from the polybutylene terephthalate resin (A) or the polyester block copolymer (B) described above. For example, a polyester block copolymer having the molar ratio ((a1)/(a2)) of more than 4 may be used.

Preferable examples of the copolyester resin (C) of the present invention include a resin containing 40 mol % or more, of ethylene glycol, 80 to 180 mol % in total of terephthalic acid and ethylene glycol, and a resin containing 40 mol % or more of 1,4-butanediol and 80 to 180 mol % in total of terephthalic acid and 1,4-butanediol, based on 100 mol % of the entire acid component constituting the resin and 100 mol % of the entire glycol component constituting the resin. Preferable examples of the copolymer components include at least one member selected from the group consisting of isophthalic acid, sebacic acid, adipic acid, trimellitic acid, 2,6-naphthalene dicarboxylic acid, diethylene glycol, neopentyl glycol, 1,4-cyclohexane dimethanol, 1,4-butanediol, 1,2-propanediol, 1,3-propanediol, ethylene glycol, and 2-methyl-1,3-propanediol. The ethylene glycol and the 1,4-butanediol may serve as copolymer components in a polyester resin in which they are not contained as the major components.

The copolyester resin (C) is preferably a polyester resin comprising an ethylene terephthalate unit or a butylene terephthalate unit copolymerized with at least one of alkyl side chain-containing glycol and isophthalic acid, and is also preferably amorphous. Examples of the alkyl side chain-containing glycol include neopentyl glycol, 1,2-propanediol, and 2-methyl-1,3-propanediol. Among these, preferable copolymer components in view of the various characteristics include neopentyl glycol, isophthalic acid, and like components that decrease crystallinity.

The copolymerization ratio of the alkyl side chain-containing glycol is preferably 20 to 60 mol %, and more preferably 25 to 50 mol %, based on 100 mol % of the entire glycol component constituting the copolyester resin (C).

The copolymerization ratio of the isophthalic acid is preferably 20 to 60 mol %, and more preferably 25 to 50 mol %, based on 100 mol % of the entire acid component constituting the copolyester resin (C).

The polymerization degree of the copolyester resin (C) slightly varies depending on the specific copolymerization composition; however, the intrinsic viscosity (measured at 30° C. with an Ubbelohde viscometer using a 0.1 g sample dissolved in 25 ml of a mixed solvent of phenol/tetrachloroethane (mass ratio 6/4)) is preferably 0.4 to 1.5 dl/g, more preferably 0.4 to 1.3 dl/g. When the intrinsic viscosity is less than 0.4 dl/g, the toughness tends to decrease. When the intrinsic viscosity is more than 1.5 dl/g, the fluidity tends to decrease.

The content of the copolyester resin (C) in the polybutylene terephthalate resin composition is 0 to 50 mass %, preferably 0 to 25 mass %, more preferably 5 to 25 mass %, and further preferably 5 to 20 mass %. By specifying the content of the copolyester resin (C) within this range, the addition of the copolyester resin (C) makes it possible to improve the bonding strength compared with a polybutylene terephthalate resin composition in which the same amount of the polyester block copolymer (B) is added. A content of more than 50 mass % is not preferable because, although a desirable bonding strength is obtained, the heat resistance decreases.

Inorganic Filler (D)

The polybutylene terephthalate resin composition of the present invention may comprise an inorganic filler (D) so as to improve the heat resistance and rigidity, insofar as the effects of the present invention are not impaired. The inorganic filler (D) is classified into a fibrous filler and a non-fibrous filler. Examples of the fibrous filler used in the present invention include glass fibers, carbon fibers, potassium titanate fibers, silica-alumina fibers, zirconia fibers, metal fibers and the like. Among these, glass fibers are preferable.

As the glass fibers, any known glass fibers are preferably used, regardless of the glass fiber diameter; the shape, such as circular, cocoon-shaped cross-section, or oval-shaped cross-section; or the length or the glass-cutting method for use in the production of chopped strand or roving. In the present invention, the type of glass is also not limited.

However, in view of quality, E glass and corrosive-resistant glass containing zirconium in the composition are preferably used.

Further, in the present invention, for the purpose of improving the interfacial characteristics between the fibrous filler and the resin matrix, a surface-treated fibrous filler, which is treated with an organic treating agent, such as aminosilane compounds, epoxy compounds, and the like, is preferably used. For the aminosilane compounds and epoxy compounds used for the fibrous filler, known compounds may be used. Any types of the aminosilane compounds and epoxy compounds may be used for the surface treatment of the fibrous filler of the present invention.

As the plate-shaped or granular non-fibrous inorganic fillers, for example, glass beads, glass flakes, silica, kaolin, talc, mica, wollastonite, titanium oxide, zinc oxide, alumina, calcium carbonate, magnesium carbonate, and the like may be used. In view of the balance of impact resistance, fluidity, and product appearance, glass beads, kaolin, talc, and mica are preferable; and kaolin and mica are more preferable. Since the strength becomes insufficient when plate-shaped or granular non-fibrous inorganic fillers are used solely, it is preferable to use them in combination with fibrous fillers.

The content of the inorganic filler (D) in the polybutylene terephthalate resin composition is 0 to 55 mass %, preferably 10 to 55 mass %, more preferably 15 to 50 mass %, and further preferably 20 to 40 mass %. By specifying the content of the inorganic filler (D) within this range, it is possible to obtain a polybutylene terephthalate resin composition that can be bonded with a polyester elastomer, while ensuring a sufficient bonding strength with the polyester elastomer; as well as improved heat resistance and rigidity.

Other Additives

In addition, the polybutylene terephthalate resin composition of the present invention may comprise various known additives as necessary, insofar as the characteristics of the present invention are not impaired. Examples of known additives include coloring agents such as pigments, mold-release agents, heat-resistant stabilizers, antioxidants, UV absorbers, light stabilizers, plasticizers, denaturating agents, antistatic agents, flame retardants, dyes, and the like.

Examples of mold-release agents include long-chain fatty acids or esters, and metal salts thereof; amide-based compounds; polyethylene wax; silicon; polyethylene oxide; and the like. Particularly preferable long-chain fatty acids include those having at least 12 carbon atoms, such as stearic acid, 12-hydroxystearic acid, behenic acid, montanoic acid, and the like. The carboxylic acids may be partially or entirely esterified by monoglycol or polyglycol, or may form metal salts. Examples of amide-based compounds include ethylenebis terephthalamide, methylenebis stearylamide, and the like. These mold-release agents may be used solely, or as a mixture.

These various additives may be contained in an amount of up to 5 mass % in total, based on 100 mass % of the polybutylene terephthalate resin composition. More specifically, the total amount of (A), (B), (C), and (D) is preferably 95 to 100 mass %, based on 100 mass % of the polybutylene terephthalate resin composition.

Polybutylene Terephthalate Resin Composition

The method for producing the polybutylene terephthalate resin composition of the present invention comprises mixing the components according to the compounding ratio specified above in an arbitrary order; and mixing the components with a tumbler, a Henschel mixer, or the like to perform melt-kneading. Any method known to those skilled in the art may be used as the melt-kneading method. A single-screw extruder, a twin-screw extruder, a kneader, a Banbury mixer, a roll, and the like can be used. Among these, a twin-screw extruder is preferable. Further, in order to remove volatile components and decomposed low-molecular-weight components during the processing, it is preferable to perform suction by using a vacuum pump between the side port of the glass fiber feeder and the die head in the top end of the extruder.

The polybutylene terephthalate resin composition of the present invention is used for a molded article for welding polyester elastomers. In particular, the polybutylene terephthalate resin composition of the present invention is used for a molded article that enables welding of polyester elastomers by insert molding.

The polybutylene terephthalate resin composition of the present invention may be formed into a molded article by a known molding method such as injection molding. This molded article may be used for the composite material explained below.

Composite Material

A composite molded article in which a molded article comprising the polybutylene terephthalate resin composition of the present invention and a polyester elastomer are welded is explained below. The composite molded article is obtained by placing a molded article comprising a polybutylene terephthalate resin composition as an insert material in a mold, and welding a polyester elastomer by injection molding. In the insert molding, the material (insert material) placed in the mold is referred to as a primary material. In the present invention, the primary material is the molded article comprising a polybutylene terephthalate resin composition. The material to be injected into the mold in which the insert material has been placed is referred tows a secondary material. In the present invention, the secondary material is a polyester elastomer.

The polyester elastomer as the secondary material may be the same as or different from the polyester block copolymer (B) used for the primary material described above. The polyester elastomer as the secondary material is not particularly limited. It is sufficient that the polyester elastomer is polyester elastomer in which a hard segment composed of a polyester containing dicarboxylic acid and aliphatic and/or alicyclic glycol as constituents; and a soft segment, which is at least one member selected from aliphatic polyethers, aliphatic polyesters, and aliphatic polycarbonates, are combined. The polyester block copolymer (B) used as the primary material described above or a polyester block copolymer (B) having a molar ratio ((a1)/(a2)) of more than 4 is usable. Regarding the hardness (surface hardness) of the polyester elastomer used as the secondary material, it is possible to use a wide range of polyester elastomers, from those having a low hardness, i.e., a Shore A hardness of about 65; to those having a high hardness, i.e., a Shore D hardness of about 75. The polyester elastomer preferably has a Shore D hardness of 25 to 65, more preferably a Shore D hardness of 30 to 60. In a preferred embodiment, the same kind of soft segment is used for both the polyester elastomer as the secondary material and the polyester block copolymer (B) used as the primary material.

The significant characteristic of the present invention is that a wide range of polyester elastomers, from those having a low hardness to those having a high hardness, may be bonded (welded) as the secondary material.

The reason for the excellent bonding (welding) of the molded article composed of a polybutylene terephthalate resin composition as the primary material and the polyester elastomer as the secondary material by insert molding is assumed to be as follows. It is assumed that due to the incorporation of a specific amount of the polyester block copolymer (B) in the primary material, the polyester block copolymer (B) dispersed in the form of a sea-island structure in the polybutylene terephthalate resin (A) is melted by the melting heat of the polyester elastomer introduced as the secondary material; as a result, the dispersed polyester block copolymer in the primary material side and the polyester elastomer in the secondary material side are mixed, thereby giving adhesiveness. It is assumed that the incorporation of the copolyester resin (C) enables the polybutylene terephthalate resin (A) in the primary material to move more easily, and that mixing therefore becomes easier.

Due to its advantageous characteristics, the composite material of the present invention is applicable to air ducts, bearings, rollers, covers, various housings, connectors, grips, casters, and the like.

EXAMPLES

The present invention is specifically described below with reference to the Examples and Comparative Examples. However, the present invention is not limited to these Examples. The measurement values in the Examples were measured by the following method.

(1) Intrinsic Viscosity of Polybutylene Terephthalate Resin and Copolyester Resin 0.1 g of a sample was dissolved in 25 ml of a mixed solvent of phenol/tetrachloroethane (mass ratio 6/4), and the solution was subjected to measurement at 30° C. using a Ubbelohde viscometer, (unit: dl/g)

(2) Reduced Viscosity of Polyester Block Copolymer and Polyester Elastomer 0.05 g of a sample was dissolved in 25 ml of a mixed solvent of phenol/tetrachloroethane (mass ratio 60/40)), and the solution was subjected to measurement at 30° C. using an Ostwald viscometer. (unit: dl/g)

(3) Hardness (Surface Hardness) of Polyester Block Copolymer and Polyester Elastomer The hardness was measured according to JIS K7215 (-1986). A test sample was prepared by laminating three injection-molded articles (length=100 mm, width=100 mm, thickness=2 mm) produced at a cylinder temperature of 240° C. and a mold temperature of 50° C. The hardness of the sample was measured using a durometer at a measurement pressure of 5000 g with a type D indenter. The value 5 seconds after the start of the measurement was used as the D hardness (Shore D hardness).

Production of Half Dumbbell of Polybutylene Terephthalate Resin Composition for Insert Molding A polybutylene terephthalate resin composition pellet obtained by compounding was processed by an injection molding machine (J110AD-110H: produced by Japan Steel Works, Ltd.) at a cylinder temperature of 260° C., a mold temperature of 50° C., an injection speed of 50 mm/sec, and a dwell pressure of 40 MPa, so as to obtain a half-sized dumbbell sample for tensile test according to ISO 3167.

(5) Insert Molding

After attaching the half-dumbbell sample for ISO tensile test obtained above to an ISO tensile test dumbbell molding cavity without touching the joint surface, a polyester elastomer was injection-molded at a cylinder temperature of 260° C., a mold temperature of 60° C., and an injection speed of 50 mm/sec to form the rest of the dumbbell part by injection molding, thereby obtaining an ISO tensile test dumbbell in which the polybutylene terephthalate resin composition and the polyester elastomer were bonded (welded) at the central portion. As the polyester elastomer, various polyester elastomers shown in Tables 1 and 2 were used.

(6) Evaluation of Bonding Property

The ISO tensile test dumbbell obtained above in which the polybutylene terephthalate resin composition and the polyester elastomer are bonded at the central portion was subjected to measurement according to ISO-527-1.2 to determine the breaking elongation (%) of the dumbbell. Further, the condition of the polyester elastomer was evaluated.

In the above tensile test, a test sample having an elongation of 10% or more was observed after the test, and it was confirmed that a polyester elastomer was adhered to the joint portion of the polybutylene terephthalate composition, thus confirming the evidence of bonding. Accordingly, it was judged that a sample having an elongation of 10% or more has a sufficient bonding strength in a portion where stress is generated.

The components used in the Examples and Comparative Examples are shown below.

Polybutylene Terephthalate Resin (A)

(A) Polybutylene terephthalate resin having an intrinsic viscosity of 0.90 dl/g, produced by Toyobo Co., Ltd.

Polyester Block Copolymer (B)

(B-1) Copolymer having a composition ratio of TPA/IPA//1,4-BD/PTMG1000=75/25//92/8 (mol %): a sample of Pelprene® (Toyobo Co., Ltd.): reduced viscosity=1.51 dl/g, Shore D hardness=50, (a1)/(a2)=3
(B-1) Copolymer having a composition ratio of TPA/IPA//1,4-BD/PTMG1000=73/27//87/13 (mol %): a sample of Pelprene® (Toyobo Co., Ltd.): reduced viscosity=1.95 dl/g, Shore D hardness=39, (a1)/(a2)=2.7

Copolyester Resin (C)

(C-1) Copolymer having a composition ratio of TPA//EG/NPG=100//70/30 (mol %): a sample of Vylon® (Toyobo Co., Ltd.): intrinsic viscosity=0.83 dl/g
(C-2) Copolymer having a composition ratio of TPA/IPA//EG/NPG=50/50//50/50 (mole %): a sample of Vylon® (Toyobo Co., Ltd.): intrinsic viscosity=0.53 dl/g Abbreviations TPA: terephthalic acid, IPA: isophthalic acid, 1,4-BD; 1,4-butane diol, PTMG1000: polyoxytetramethylene glycol (number average molecular weight=1000), EG: ethylene glycol, NPG: neopentyl glycol component Inorganic Filler (D) (The Fiber Diameter and the Fiber Length are Measured by Electron Microscopy, and the Average Particle Diameter is Measured by Laser Diffractometry (50% Diameter of Cumulative Particle Diameter Distribution by Weight (Volume)))

(D-1) Glass fiber (T-120H (Nippon Electric Glass Co., Ltd.): average fiber length=3 mm, average fiber diameter=11 μm)
(D-2) Talc (Talcan PK-C (Hayashi Kasei Co., Ltd.): average particle diameter=12.0 μm)

(E) Polyester Elastomer (E-1) Copolymer having a composition ratio of TPA//1,4-BD/PTMG2000=100//75/25 (mol %): a sample of Pelprene® (Toyobo Co., Ltd.): reduced viscosity=2.50 dl/g, Shore D hardness=31
(E-2) Copolymer having a composition ratio of TPA//1,4-BD/PTMG1000=100//88/12 (mol %): a sample of Pelprene® (Toyobo Co., Ltd.): reduced viscosity=1.75 dl/g, Shore D hardness=52
(E-3) Copolymer having a composition ratio of TPA//1,4-BD/PTMG1000=100//93/7 (mol %): a sample of Pelprene® (Toyobo Co., Ltd.): reduced viscosity=1.52 dl/g, Shore D hardness=57

Abbreviations

TPA: terephthalic acid, 1,4-BD: 1,4-butanediol, PTMG1000: polyoxytetramethylene glycol (number average molecular weight: 1000), PTMG2000: polyoxytetramethylene glycol (number average molecular weight 2000)

Other Elastomers (E-4) Modiper A5300 (ethylene ethyl acrylate-graft-butyl acrylate/methyl methacrylate, produced by NOF Corporation)

Examples 1 to 11 and Comparative Examples 1 to 7

The polybutylene terephthalate resin compositions of the Examples and the Comparative Examples were prepared by weighing the raw materials described above according to the compounding ratio (parts by mass) shown in Tables 1 and 2, and melt-kneading the resulting mixture at a cylinder temperature of 260° C. and a screw rotation speed of 200 rpm using a 35φ twin-screw extruder (produced by Toshiba Machine Co., Ltd.). Raw materials other than the inorganic filler were introduced from a hopper to the twin-screw extruder, and the inorganic filler was introduced from the vent port by side-feeding (when two or more types of inorganic fillers were used, they were introduced from separate side feeds). The resulting polybutylene terephthalate resin composition pellets were dried, and then molded into various evaluation samples with an injection molding machine. The evaluation results are shown in Tables 1 and 2.

TABLE 1

| Type | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|
| (A) Polybutylene Terephthalate Resin | 90 | 80 | 70 | 90 | 70 | 80 | 80 | 65 | 65 | 45 | 45 |
| (B-1) Polyester Block Copolymer | 10 | 20 | 30 | | | 20 | 20 | 20 | 20 | 15 | 15 |
| (B-2) Polyester Block Copolymer | | | | 10 | 30 | | | | | | |
| (C-1) Copolyester Resin | | | | | | | | 15 | | 10 | 10 |
| (C-2) Copolyester Resin | | | | | | | | | 15 | | |
| (D-1) Inorganic Filler | | | | | | | | | | 30 | 20 |
| (D-2) Inorganic Filler | | | | | | | | | | | 10 |
| Polyester Elastomer to be Bonded | (E-2) | (E-2) | (E-2) | (E-2) | (E-2) | (E-1) | (E-3) | (E-2) | (E-2) | (E-2) | (E-2) |
| Breaking Elongation (%) | 10 | 22 | 39 | 15 | 43 | 93 | 10 | 56 | 47 | 52 | 38 |

TABLE 2

| Type | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| (A) Polybutylene Terephthalate Resin | 90 | 90 | 80 | 90 | 90 | 65 | 45 |
| (B-1) Polyester Block Copolymer | | | | | | | |
| (B-2) Polyester Block Copolymer | | | | | | | |
| (C-1) Copolyester Resin | | | | | | 15 | 10 |
| (C-2) Copolyester Resin | | | | | | | |

TABLE 2-continued

| Type | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| (D-1) Inorganic Filler | | | | | | | 30 |
| (D-2) Inorganic Filler | | | | | | | |
| (E-1) Polyester Elastomer | 10 | | | | | | |
| (E-2) Polyester Elastomer | | 10 | 20 | | | 20 | 15 |
| (E-3) Polyester Elastomer | | | | 10 | | | |
| (E-4) Elastomer | | | | | 10 | | |
| Polyester Elastomer to be Bonded | (E-2) | (E-2) | (E-2) | (E-3) | (E-2) | (E-2) | (E-2) |
| Breaking Elongation (%) | 4 | 2 | 4 | 1 | 1 | 4 | 3 |

The resin compositions of the Examples had a breaking elongation (%) of 10% or more, regardless of the type of the polyester elastomer bonded thereto. It is thus understood that the bonding (welding) was sufficient in these resin compositions. In Examples 8 and 9 in which copolyester resin (C) was used, the breaking elongation (%) increased (the bonding strength was improved), compared with Example 2 in which copolyester resin (C) was not used. The bonding property was also superior in Examples 10 and 11 using the inorganic filler (D). More specifically, by incorporating the polyester block copolymer (B), polyester elastomers with a wide range of hardness may be bonded.

In contrast, in Comparative Examples 1 to 7, which do not contain the polyester block copolymer (B), the bonding (welding) property was poor when welded with a polyester elastomer having a relatively high hardness. In Comparative Example 5 using an elastomer other than polyester elastomer, sufficient bonding strength was not expressed.

INDUSTRIAL APPLICABILITY

Since the resin composition of the present invention ensures a practically satisfactory bonding strength compared with previously known polybutylene terephthalate resin compositions, the resin composition of the present invention is useful as a material for molded products that enables bonding with a polyester elastomer by insert molding.

The invention claimed is:

1. A polybutylene terephthalate resin composition for use in a molded article for welding a polyester elastomer, the polybutylene terephthalate resin composition comprising: 40 to 95 mass % of a polybutylene terephthalate resin (A); 4 to 40 mass % of a polyester block copolymer (B); >0 to 50 mass % of a copolyester resin (C) different from (B); and 0 to 55 mass % of an inorganic filler (D), the polyester block copolymer (B) comprising, as constituents, a hard segment (a3) and a soft segment (a4), the hard segment (a3) being composed of a polyester containing, as dicarboxylic acid components, terephthalic acid or an ester-forming derivative thereof (a1) and at least one dicarboxylic acid other than terephthalic acid or an ester-forming derivative thereof (a2) at a molar ratio ((a1)/(a2)) of 1 to 4, and the soft segment (a4) being at least one member selected from aliphatic polyethers, aliphatic polyesters and aliphatic polycarbonates.

2. The polybutylene terephthalate resin composition according to claim 1, wherein the copolyester resin (C) is a polyester resin comprising an ethylene terephthalate unit or a butylene terephthalate unit copolymerized with at least one of alkyl side chain-containing glycol and isophthalic acid.

3. A composite molded article in which a molded article comprising a polybutylene terephthalate resin composition and a polyester elastomer are welded, wherein the polybutylene terephthalate resin composition comprises: 40 to 95 mass % of a polybutylene terephthalate resin (A); 4 to 40 mass % of a polyester block copolymer (B); 0 to 50 mass % of a copolyester resin (C) different from (B); and 0 to 55 mass % of an inorganic filler (D), the polyester block copolymer (B) comprising, as constituents, a hard segment (a3) and a soft segment (a4), the hard segment (a3) being composed of a polyester containing, as dicarboxylic acid components, terephthalic acid or an ester-forming derivative thereof (a1) and at least one dicarboxylic acid other than terephthalic acid or an ester-forming derivative thereof (a2) at a molar ratio ((a1)/(a2)) of 1 to 4, and the soft segment (a4) being at least one member selected from aliphatic polyethers, aliphatic polyesters and aliphatic polycarbonates.

4. The composite molded article according to claim 3, wherein the copolyester resin (C) is a polyester resin comprising an ethylene terephthalate unit or a butylene terephthalate unit copolymerized with at least one of alkyl side chain-containing glycol and isophthalic acid.

5. A method for producing a composite molded article, comprising placing a molded article comprising a polybutylene terephthalate resin composition as an insert material in a mold, and welding a polyester elastomer by injection molding, wherein the polybutylene terephthalate resin composition comprises: 40 to 95 mass % of a polybutylene terephthalate resin (A); 4 to 40 mass % of a polyester block copolymer (B); 0 to 50 mass % of a copolyester resin (C) different from (B); and 0 to 55 mass % of an inorganic filler (D), the polyester block copolymer (B) comprising, as constituents, a hard segment (a3) and a soft segment (a4), the hard segment (a3) being composed of a polyester containing, as dicarboxylic acid components, terephthalic acid or an ester-forming derivative thereof (a1) and at least one dicarboxylic acid other than terephthalic acid or an ester-forming derivative thereof (a2) at a molar ratio ((a1)/(a2)) of 1 to 4, and the soft segment (a4) being at least one member selected from aliphatic polyethers, aliphatic polyesters and aliphatic polycarbonates.

6. The method for producing a composite molded article according to claim 5, wherein the copolyester resin (C) is a polyester resin comprising an ethylene terephthalate unit or a butylene terephthalate unit copolymerized with at least one of alkyl side chain-containing glycol and isophthalic acid.

* * * * *